US012610241B2

(12) United States Patent
Singh

(10) Patent No.: US 12,610,241 B2
(45) Date of Patent: Apr. 21, 2026

(54) SYSTEM AND METHOD FOR DETECTING RADIO-FREQUENCY-BASED ATTACKS IN A PREDETERMINED AREA

(71) Applicant: Bank of America Corporation, Charlotte, NC (US)

(72) Inventor: Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 472 days.

(21) Appl. No.: 18/183,777

(22) Filed: Mar. 14, 2023

(65) Prior Publication Data

US 2024/0310469 A1 Sep. 19, 2024

(51) Int. Cl.
*H04W 12/121* (2021.01)
*H04W 12/104* (2021.01)

(52) U.S. Cl.
CPC ....... *H04W 12/121* (2021.01); *H04W 12/104* (2021.01)

(58) Field of Classification Search
CPC ............. H04W 12/121; H04W 12/104; H04W 12/122; H04W 64/00; H04W 4/021; G01S 2205/01; G01S 5/02; G01S 5/0273; H04M 3/42348
See application file for complete search history.

(56) References Cited

U.S. PATENT DOCUMENTS 7,742,456 B2 * 6/2010 Kawaguchi ........... H04W 64/00
370/338
8,242,905 B2 8/2012 Gerner et al.

8,525,687 B2 9/2013 Tran
8,819,824 B2 * 8/2014 Christofferson ...... H04W 12/08
340/541
8,890,669 B2 11/2014 Du et al.
8,917,159 B2 12/2014 McAllister et al.
9,129,200 B2 9/2015 Lavedas
(Continued)

OTHER PUBLICATIONS

Radio frequency: An airborne threat to corporate and government networks, https://www.securitymagazine.com/articles/92729-radio-frequency-an-airbone-threat-to-corporate-and-government-networks; printed Mar. 1, 2023.
(Continued)

*Primary Examiner* — Hosuk Song

(57) ABSTRACT

An apparatus may be configured to detect radio-frequency (RF)-based attacks in a predetermined area. The server may include a memory and a processor. The memory may be configured to store a baseline RF signature corresponding to an electric component located in a predetermined area. The baseline RF signature may comprise an expected RF signature tracked from the electric component during a predetermined amount of time. The processor may be configured to monitor electronic operations of the electric component over the predetermined amount of time. The electric component may be located in the predetermined area. The processor may be configured to track an RF signature associated with the electric component. The processor may be configured to determine that the RF signature comprises an anomaly during the predetermined amount of time based at least in part upon the RF signature being different from the baseline RF signature corresponding to the electric component.

20 Claims, 6 Drawing Sheets

(56) References Cited

U.S. PATENT DOCUMENTS

| | | | | |
|---|---|---|---|---|
| 9,439,168 | B2 * | 9/2016 | Rowitch | H04B 17/309 |
| 9,607,286 | B1 | 3/2017 | Diorio | |
| 9,635,044 | B2 * | 4/2017 | Baxley | H04B 17/391 |
| 9,642,014 | B2 | 5/2017 | Keller | |
| 9,736,175 | B2 * | 8/2017 | Baxley | H04B 17/318 |
| 9,880,256 | B2 | 1/2018 | Baxley et al. | |
| 10,122,736 | B2 | 11/2018 | Baxley et al. | |
| 10,129,233 | B2 | 11/2018 | Nystrom et al. | |
| 10,149,159 | B1 * | 12/2018 | Perfitt | H04L 9/3265 |
| 10,530,811 | B2 | 1/2020 | Black et al. | |
| 10,588,021 | B2 | 3/2020 | Shattil et al. | |
| 10,601,592 | B2 | 3/2020 | Rose et al. | |
| 10,631,168 | B2 | 4/2020 | Chari et al. | |
| 10,684,350 | B2 * | 6/2020 | Dupray | H04W 4/029 |
| 11,182,794 | B1 | 11/2021 | Aument | |
| 11,541,844 | B2 | 1/2023 | Murray et al. | |
| 2013/0212694 | A1 | 8/2013 | Castiglia et al. | |
| 2018/0191775 | A1 | 7/2018 | Watson | |
| 2021/0051443 | A1 | 2/2021 | Conus | |
| 2022/0109702 | A1 | 4/2022 | Correnti et al. | |
| 2022/0318380 | A1 | 10/2022 | Singh | |
| 2024/0314566 | A1 * | 9/2024 | Singh | G01S 13/886 |

OTHER PUBLICATIONS

How to Protect Against 5G and Radiofrequency (RF) Cyberattacks, https://defendershield.com/5g-and-radiofrequency-rf-cyber-attacks; printed Mar. 1, 2023.
Singh, Shailendra, System and method for detecting radio-frequency-based attackers in a predetermined area, U.S. Appl. No. 18/183,793, filed Mar. 14, 2023.

* cited by examiner

ASSET MAPPING TABLE 400

| ASSET NAME | UWB TAG ID | RF SIGNATURE | ANOMALY SCORE | ELECTRIC COMPONENT LOCATION | SECURITY POLICY |
|---|---|---|---|---|---|
| WIFI ROUTER | UWB001 | B1 | 10 | X, Y, Z | DISCONNECT |
| SERVER 1 | UWB002 | A1.1 | 7 | X, Y, Z | ISOLATE |
| SERVER 2 | UWB003 | A2.3 | 5 | X, Y, Z | DISCONNECT |
| SERVER 3 | UWB004 | C1.0 | 3 | X, Y, Z | MONITOR |
| PRINTER 1 | UWB005 | P3.3 | 1 | X, Y, Z | NULL |
| PRINTER 2 | UWB006 | P3.4 | 1 | X, Y, Z | NULL |

FIG. 4

PROCESS 500

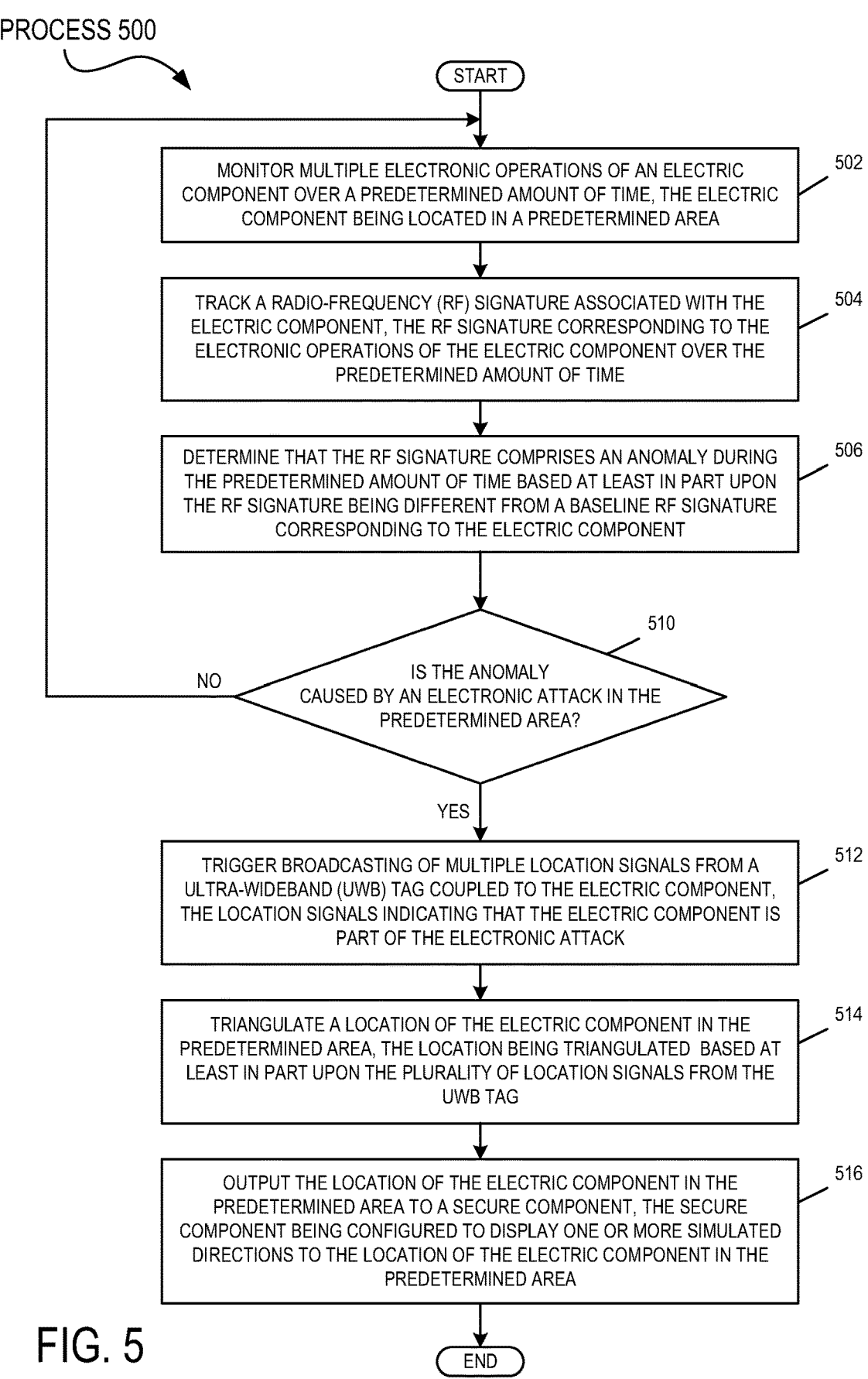

START

MONITOR MULTIPLE ELECTRONIC OPERATIONS OF AN ELECTRIC COMPONENT OVER A PREDETERMINED AMOUNT OF TIME, THE ELECTRIC COMPONENT BEING LOCATED IN A PREDETERMINED AREA          502

TRACK A RADIO-FREQUENCY (RF) SIGNATURE ASSOCIATED WITH THE ELECTRIC COMPONENT, THE RF SIGNATURE CORRESPONDING TO THE ELECTRONIC OPERATIONS OF THE ELECTRIC COMPONENT OVER THE PREDETERMINED AMOUNT OF TIME          504

DETERMINE THAT THE RF SIGNATURE COMPRISES AN ANOMALY DURING THE PREDETERMINED AMOUNT OF TIME BASED AT LEAST IN PART UPON THE RF SIGNATURE BEING DIFFERENT FROM A BASELINE RF SIGNATURE CORRESPONDING TO THE ELECTRIC COMPONENT          506

510

IS THE ANOMALY CAUSED BY AN ELECTRONIC ATTACK IN THE PREDETERMINED AREA?

NO

YES

TRIGGER BROADCASTING OF MULTIPLE LOCATION SIGNALS FROM A ULTRA-WIDEBAND (UWB) TAG COUPLED TO THE ELECTRIC COMPONENT, THE LOCATION SIGNALS INDICATING THAT THE ELECTRIC COMPONENT IS PART OF THE ELECTRONIC ATTACK          512

TRIANGULATE A LOCATION OF THE ELECTRIC COMPONENT IN THE PREDETERMINED AREA, THE LOCATION BEING TRIANGULATED BASED AT LEAST IN PART UPON THE PLURALITY OF LOCATION SIGNALS FROM THE UWB TAG          514

OUTPUT THE LOCATION OF THE ELECTRIC COMPONENT IN THE PREDETERMINED AREA TO A SECURE COMPONENT, THE SECURE COMPONENT BEING CONFIGURED TO DISPLAY ONE OR MORE SIMULATED DIRECTIONS TO THE LOCATION OF THE ELECTRIC COMPONENT IN THE PREDETERMINED AREA          516

FIG. 5

END

PROCESS 600

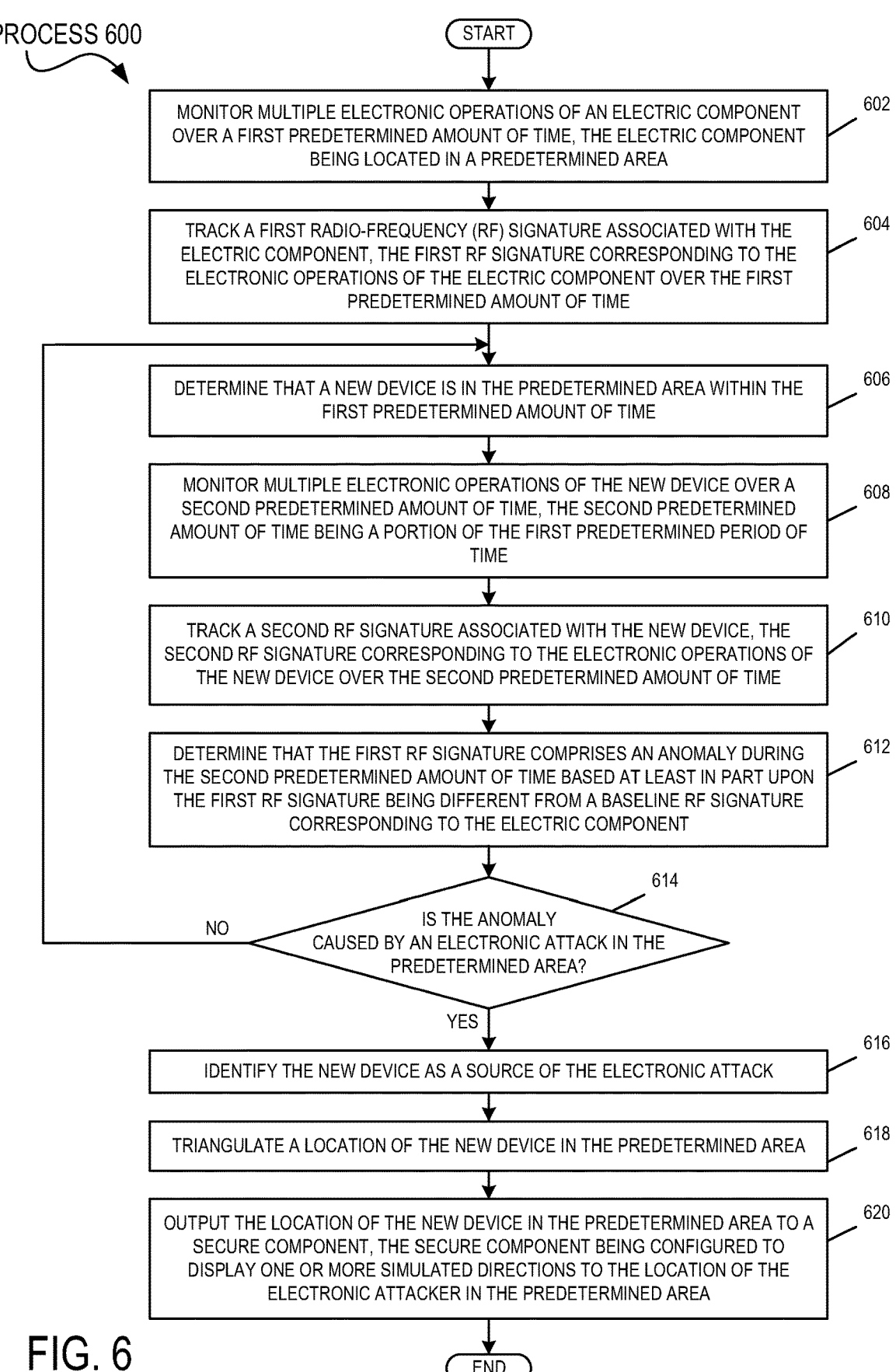

START

MONITOR MULTIPLE ELECTRONIC OPERATIONS OF AN ELECTRIC COMPONENT OVER A FIRST PREDETERMINED AMOUNT OF TIME, THE ELECTRIC COMPONENT BEING LOCATED IN A PREDETERMINED AREA — 602

TRACK A FIRST RADIO-FREQUENCY (RF) SIGNATURE ASSOCIATED WITH THE ELECTRIC COMPONENT, THE FIRST RF SIGNATURE CORRESPONDING TO THE ELECTRONIC OPERATIONS OF THE ELECTRIC COMPONENT OVER THE FIRST PREDETERMINED AMOUNT OF TIME — 604

DETERMINE THAT A NEW DEVICE IS IN THE PREDETERMINED AREA WITHIN THE FIRST PREDETERMINED AMOUNT OF TIME — 606

MONITOR MULTIPLE ELECTRONIC OPERATIONS OF THE NEW DEVICE OVER A SECOND PREDETERMINED AMOUNT OF TIME, THE SECOND PREDETERMINED AMOUNT OF TIME BEING A PORTION OF THE FIRST PREDETERMINED PERIOD OF TIME — 608

TRACK A SECOND RF SIGNATURE ASSOCIATED WITH THE NEW DEVICE, THE SECOND RF SIGNATURE CORRESPONDING TO THE ELECTRONIC OPERATIONS OF THE NEW DEVICE OVER THE SECOND PREDETERMINED AMOUNT OF TIME — 610

DETERMINE THAT THE FIRST RF SIGNATURE COMPRISES AN ANOMALY DURING THE SECOND PREDETERMINED AMOUNT OF TIME BASED AT LEAST IN PART UPON THE FIRST RF SIGNATURE BEING DIFFERENT FROM A BASELINE RF SIGNATURE CORRESPONDING TO THE ELECTRIC COMPONENT — 612

614
IS THE ANOMALY CAUSED BY AN ELECTRONIC ATTACK IN THE PREDETERMINED AREA?

NO

YES

IDENTIFY THE NEW DEVICE AS A SOURCE OF THE ELECTRONIC ATTACK — 616

TRIANGULATE A LOCATION OF THE NEW DEVICE IN THE PREDETERMINED AREA — 618

OUTPUT THE LOCATION OF THE NEW DEVICE IN THE PREDETERMINED AREA TO A SECURE COMPONENT, THE SECURE COMPONENT BEING CONFIGURED TO DISPLAY ONE OR MORE SIMULATED DIRECTIONS TO THE LOCATION OF THE ELECTRONIC ATTACKER IN THE PREDETERMINED AREA — 620

FIG. 6

END

SYSTEM AND METHOD FOR DETECTING RADIO-FREQUENCY-BASED ATTACKS IN A PREDETERMINED AREA

TECHNICAL FIELD

The present disclosure relates generally to operation of a security system, and more specifically to a system and method for detecting radio-frequency-based attacks in a predetermined area.

BACKGROUND

Electronic attacks are actions involving an attempt to control communications or operations of one or more target electronic devices. Electronic attacks include attacks involving physical contact with the target electronic devices and attacks that do not involve physical contact with the target electronic devices. Radio-frequency (RF) attacks are a type of electronic attacks that include actions intended to hack the target electronic devices without requiring physical contact. Under RF attacks, the target electronic devices are disrupted, damaged, or interfered with by radio waves sent by an electronic attacker. For example, electronic attackers may use an RF attack to hack communications and operations of a wireless electronic device (i.e., an electronic device with wireless capabilities). As a result of the RF attack, the electronic attacker may control communications or operations of the hacked wireless electronic device. In this regard, the electronic attacker may modify, cancel, or generate communications or operations in the hacked wireless electronic device.

It is difficult to identify when wireless electronic devices are under RF attacks because there is no direct connection between the electronic attacker and the wireless electronic devices. As such, currently, there are no reliable solutions to detect electronic attacks or electronic attackers in a given space.

SUMMARY OF THE DISCLOSURE

In one or more embodiments, a system and a method disclosed herein detect when wireless electric components (i.e., electric devices with wireless capabilities) are under electronic attacks from an electronic attacker even though there may not exist a direct connection between the electronic attacker and the wireless electric component. In some embodiments, the system and the method provide reliable solutions to identify electronic attacks and electronic attackers in a given area. Electronic attacks are actions involving an attempt to control communications or operations of one or more target electric components. Electronic attacks include attacks involving physical contact with the target electric components and attacks that do not involve physical contact with the target electric components. Radio-frequency (RF) attacks are a type of electronic attacks that include actions intended to hack the target electric components without requiring physical contact. Under RF attacks, the target electronic devices are disrupted, damaged, or interfered with by radio waves sent by the electronic attacker. For example, electronic attackers may be a person, people, or an automated electric component that use an RF attack to hack communications and operations of a specific wireless electric component. As a result of the RF attack, the electronic attacker may control communications or operations of the hacked wireless electric component. In this regard, the electronic attacker may modify, cancel, or generate communications or operations in the hacked wireless electric component. The electronic attackers may be located inside the predetermined area (i.e., local attacker) or located outside the predetermined area (i.e., range attacker). In some embodiments, the method and the system detect an attacker located inside the predetermined area.

In one or more embodiments, the system and the method monitor RF signatures of multiple electric components in a predetermined area. The predetermined area may be a room, a building, or a predefined space. The system and the method may monitor RF signatures of new devices that enter the predetermined area. Each RF signature is a representation of RF signaling transmitted and received by a specific electric component in the predetermined area. For example, the RF signaling may include electromagnetic (EM) radiation signals, Input/Output (I/O) electrical (e.g., voltage and current) signals, and electric component properties (e.g., electric component serial number). The RF signature may be a string of numerical, alphabetical, or alphanumerical values that indicate the RF signaling of the electric component.

The RF signatures may be monitored by an apparatus, such as a server, with direct connections to the electric components in the predetermined area. The server may store a baseline RF signature for each electric component in the predetermined area. In some embodiments, over a predetermined amount of time, for a specific electric component in the predetermined area, the server may compare a first baseline RF signature from storage to a corresponding first specific RF signature sensed in the predetermined amount of time. At this point, the server may determine whether an anomaly is found based on a result of the comparison between the first baseline RF signature and the first specific RF signature. In this regard, the result of the comparison indicates that the first baseline RF signature and the first specific RF signature are equal to one another or that the first baseline RF signature and the first specific RF signature are different to one another. In some embodiments, the anomaly may be one or more unexpected changes to the first RF signature in the predetermined amount of time. For example, the anomaly may be unexpected fluctuations in the first RF signaling of the electric component.

In other embodiments, an attacker is expected to enter the predetermined area as a new device. The new device may be detected by one or more RF sensors that identify a new RF signature. The RF sensors may be electric components configured to identify and monitor radio waves and frequency signals in the predetermined area. In some embodiments, the RF sensors may identify and track new RF signatures in the predetermined area. In this regard, the new RF signature may be determined to correspond to the new device in the predetermined area. The new RF signature may be monitored in relation to existing RF signatures corresponding to electric components located in the predetermined area. The new RF signature may be monitored to track interactions of the new device with one or more of the electric components in the predetermined area. Over the predetermined amount of time, the server may monitor interactions between the new device and a specific electric component in the predetermined area. During the predetermined amount of time, the server may compare a second baseline RF signature from storage to a corresponding second specific RF signature sensed in the predetermined amount of time. At this point, the server may determine whether an anomaly is found based on a result of the comparison between the second baseline RF signature and the second specific RF signature. In this regard, the result of the comparison indicates that the second baseline RF signature and the second specific RF signature are equal to one another or that the second baseline RF signature and the second specific RF signature are different to one another. In some embodiments, the anomaly may be one or more unexpected changes to the second RF signature in the predetermined amount of time. For example, the anomaly may be unexpected fluctuations in the second RF signaling of the electric component.

In one or more embodiments, upon determining the anomaly in an RF signature during the predetermined amount of time, the server determines that the electric component is caused by an electronic attack in the predetermined area. The server may trigger broadcasting of multiple location signals from an ultra-wideband (UWB) tag coupled to the electric component. The UWB tag may broadcast the location signals in multiple directions. The location signals may indicate a location of the electric component. The broadcasted location signals may be detected by one or more UWB component located at multiple locations of the predetermined area. Each UWB component may relay information about any received location signals. Upon receiving the information relayed by the UWB component, the server may triangulate a location of the electric component within the predetermined area.

After the location of the electric component is triangulated, the server may output the location to one or more secure components. A secure component may be an electric component in use by security personnel in the predetermined area. In some embodiments, the secure component is a simulated reality device configured to display simulated directions to the location of the electric component in the predetermined area in an augmented visibility field. In some embodiments, the augmented visibility field comprises the simulated directions within a predetermined sensing range. The predetermined sensing range may include a field of view in an augmented version of an environment surrounding the secure component.

In one or more embodiments, upon determining that the electric component is caused by an electronic attack in the predetermined area, the server identifies an electronic attacker perpetrating the electronic attack. In some embodiments, the server may determine that the new device is the electronic attacker upon determining that the anomaly resulted from a change identified in the new RF signature. To determine the location of the new device, the server may trigger broadcasting of multiple sensing signals from one or more RF sensors. The RF sensors may broadcast the sensing signals in multiple directions. The sensing signals may bounce-off multiple surfaces or other RF signaling in the predetermined area. The RF sensors may receive the bounced off sensed signals as feedback in the form of information vectors. Each information vector may include a magnitude of the bounce-off and a direction of arrival. In this regard, each information vector may indicate a location of any electric components in the predetermined area. In the case of the new device, the information vectors may indicate the location of the new device in the predetermined area. Upon receiving the information vectors by the RF sensors, the server may triangulate a location of the new device within the predetermined area. After the location of the new device is triangulated, the server may output the location to one or more secure components.

In one or more embodiments, the system and the method described herein are integrated into a practical application of detecting RF-based attacks in the predetermined area. In this regard, the system and the method are integrated into a practical application of providing simulated directions to identify a location of an electric component with an anomalous RF signature in the predetermined area. In particular, the system and the method provide simulated directions as overlays in a secure component. The simulated directions may be overlaid on a display that enables security personnel to see the electric component under the electronic attack in the predetermined area.

In addition, the system and method described herein are integrated into a practical application of decreasing a detection time in which attacked electric components are detected. In particular, the system and method reduce detection times, because simulated directions to the location of attacked electric components is identified and immediately outputted to secure components in use by security personnel regardless of a current position or a current location of the one or more secure components in the predetermined area. For example, if the location of an attacked electric component is identified in a first cubicle in a third floor of a building, the method and the system may alert one or more secure components of the electronic attack. In the alert, the method and the system may provide a start of simulated directions to identify the attacked electric component. In one example, a first secure component located in the third floor, may immediately display an overlay of the simulated directions indicating the attacked electric component in the first cubicle. In another example, a second secure component located in a first floor of the building, may immediately display an overlay of the simulated directions indicating that the attacked electric component is located in the third floor. In this case, the method and the system may overlay simulated directions instructing security personnel using the secure component to take the fastest route to the third floor. Under these examples, security personnel response is drastically increased because the secure component shows one or more simulated directions that change until the attacked electric component is in a line of sight of the secure component.

In one or more embodiments, the system includes an apparatus, such as a server, that includes a memory and a processor. The memory is configured to store a baseline RF signature corresponding to an electric component located in a predetermined area. The baseline RF signature comprises an expected RF signature tracked from the electric component during a predetermined amount of time. The processor is communicatively coupled to the memory and configured to monitor multiple electronic operations of the electric component over the predetermined amount of time. The electric component is located in the predetermined area. Further, the processor is configured to track an RF signature associated with the electric component. The RF signature corresponds to the electronic operations of the electric component over the predetermined amount of time. The processor is configured to determine that the RF signature comprises an anomaly during the predetermined amount of time based at least in part upon the RF signature being different from the baseline RF signature corresponding to the electric component; determine that the anomaly is caused by an electronic attack in the predetermined area; and trigger broadcasting of multiple location signals from an UWB tag coupled to the electric component. The location signals indicate that the electric component is part of the electronic attack. The processor is configured to triangulate a location of the electric component in the predetermined area. The location is triangulated based at least in part upon the location signals from the UWB tag. The processor is configured to output the location of the electric component in the predetermined area to a secure component. The secure component is configured to display one or more simulated directions to the location of the electric component in the predetermined area.

In some embodiments, the system includes multiple UWB components located in a predetermined area and an apparatus, such as a server, communicatively coupled to the UWB components and that includes a memory and a processor. The memory is configured to store a baseline RF signature corresponding to an electric component located in the predetermined area. The baseline RF signature comprises an expected RF signature tracked from the electric component during a predetermined amount of time. The processor is communicatively coupled to the memory and configured to monitor multiple electronic operations of the electric component over the predetermined amount of time. The electric component is located in the predetermined area. Further, the processor is configured to track an RF signature associated with the electric component. The RF signature corresponds to the electronic operations of the electric component over the predetermined amount of time. The processor is configured to determine that the RF signature comprises an anomaly during the predetermined amount of time based at least in part upon the RF signature being different from the baseline RF signature corresponding to the electric component; determine that the anomaly is caused by an electronic attack in the predetermined area; and trigger broadcasting of multiple location signals from an UWB tag coupled to the electric component. The location signals indicate that the electric component is part of the electronic attack. The processor is configured to triangulate a location of the electric component in the predetermined area. The location is triangulated based at least in part upon the location signals from the UWB tag. The processor is configured to output the location of the electric component in the predetermined area to a secure component. The secure component is configured to display one or more simulated directions to the location of the electric component in the predetermined area.

In other embodiments, the method is performed by an apparatus, such as a server that includes a memory and a processor. The method comprises monitoring electronic operations of an electric component over a predetermined amount of time. The electric component is located in the predetermined area. The method comprises tracking an RF signature associated with the electric component. The RF signature corresponds to the electronic operations of the electric component over the predetermined amount of time. The method comprises determining that the RF signature comprises an anomaly during the predetermined amount of time based at least in part upon the RF signature being different from a baseline RF signature corresponding to the electric component; determining that the anomaly is caused by an electronic attack in the predetermined area; and triggering broadcasting of multiple location signals from an UWB tag coupled to the electric component. The location signals indicate that the electric component is part of the electronic attack. Further, the method comprises triangulating a location of the electric component in the predetermined area. The location is triangulated based at least in part upon the location signals from the UWB tag. The method comprises outputting the location of the electric component in the predetermined area to a secure component. The secure component is configured to display one or more simulated directions to the location of the electric component in the predetermined area.

In one or more embodiments, the system and the method described herein are integrated into a practical application of detecting RF-based attackers in the predetermined area. In this regard, the system and the method are integrated into a practical application of providing simulated directions to identify a location of an electronic attacker via a relation to an electric component with an anomalous RF signature in the predetermined area. In particular, the system and the method provide simulated directions as overlays in a secure component. The simulated directions may be overlaid on a display that enables security personnel to see the electronic attacker causing the electronic attack in the predetermined area.

In addition, the system and method described herein are integrated into a practical application of decreasing a detection time in which electronic attackers are detected. In particular, the system and method reduce detection times, because simulated directions to the location of electronic attackers is identified and immediately outputted to secure components in use by security personnel regardless of a current position or a current location of the one or more secure components in the predetermined area. For example, if the location of an electronic attacker is identified in a first office in a first floor of a building, the method and the system may alert one or more secure components of the electronic attack. In the alert, the method and the system may provide a start of simulated directions to identify the electronic attacker. In one example, a first secure component located in the first floor, may immediately display an overlay of the simulated directions indicating the electronic attacker in the first office. In another example, a second secure component located in a third floor of the building, may immediately display an overlay of the simulated directions indicating that the attacked electric component is located in the first floor. In this case, the method and the system may overlay simulated directions instructing security personnel using the secure component to take the fastest route to the first floor. Under these examples, security personnel response is drastically increased because the secure component shows one or more simulated directions that change until the electronic attacker is in a line of sight of the secure component.

In one or more embodiments, the system includes an apparatus, such as a server, that includes a memory and a processor. The memory is configured to store a baseline RF signature corresponding to an electric component located in a predetermined area. The baseline RF signature comprises an expected RF signature tracked from the electric component during a first predetermined amount of time. The processor is communicatively coupled to the memory and configured to monitor first electronic operations of the electric component over a second predetermined amount of time. The second predetermined amount of time is prior the first predetermined amount of time. The processor is configured to track a first RF signature associated with the electric component. The first RF signature corresponding to the first electronic operations of the electric component over the second predetermined amount of time. the processor is configured to determine that a new device is in the predetermined area within the first predetermined amount of time; and monitor second electronic operations of the new device over a third predetermined amount of time. The third predetermined amount of time is a portion of the second predetermined amount of time. The processor is configured to track a second RF signature associated with the new device. The second RF signature corresponding to the second electronic operations of the new device over the third predetermined amount of time. Further, the processor is configured to determine that the first RF signature comprises an anomaly during the third predetermined amount of time based at least in part upon the first RF signature being different from the baseline RF signature corresponding to the electric component; determine that the anomaly is caused by an electronic attack in the predetermined area; triangulate a location of the new device in the predetermined area; and output the location of the new device in the predetermined area to a secure component. The secure component is configured to display one or more simulated directions to the location of the electronic attacker in the predetermined area.

In some embodiments, the system includes multiple RF sensors located in a predetermined area and an apparatus, such as a server, communicatively coupled to the RF sensors and that includes a memory and a processor. The memory is configured to store a baseline RF signature corresponding to an electric component located in a predetermined area. The baseline RF signature comprises an expected RF signature tracked from the electric component during a first predetermined amount of time. The processor is communicatively coupled to the memory and configured to monitor first electronic operations of the electric component over a second predetermined amount of time. The second predetermined amount of time is prior the first predetermined amount of time. The processor is configured to track a first RF signature associated with the electric component. The first RF signature corresponding to the first electronic operations of the electric component over the second predetermined amount of time. the processor is configured to determine that a new device is in the predetermined area within the first predetermined amount of time; and monitor second electronic operations of the new device over a third predetermined amount of time. The third predetermined amount of time is a portion of the second predetermined amount of time. The processor is configured to track a second RF signature associated with the new device. The second RF signature corresponding to the second electronic operations of the new device over the third predetermined amount of time. Further, the processor is configured to determine that the first RF signature comprises an anomaly during the third predetermined amount of time based at least in part upon the first RF signature being different from the baseline RF signature corresponding to the electric component; determine that the anomaly is caused by an electronic attack in the predetermined area; triangulate a location of the new device in the predetermined area; and output the location of the new device in the predetermined area to a secure component. The secure component is configured to display one or more simulated directions to the location of the electronic attacker in the predetermined area.

In other embodiments, the method is performed by an apparatus, such as a server that includes a memory and a processor. The method comprises monitoring first electronic operations of an electric component over a first predetermined amount of time. The electric component is located in the predetermined area. The method comprises tracking a first RF signature associated with the electric component. The first RF signature corresponds to the first electronic operations of the electric component over the first predetermined amount of time. The method comprises determining that a new device is in the predetermined area within the first predetermined amount of time; and monitoring second electronic operations of the new device over a second predetermined amount of time. The second predetermined amount of time is a portion of the first predetermined amount of time. The method comprises tracking a second RF signature associated with the new device. The second RF signature corresponds to the second electronic operations of the new device over the second predetermined amount of time. Further, the method comprises determining that the first RF signature comprises an anomaly during the second predetermined amount of time based at least in part upon the first RF signature being different from a baseline RF signature corresponding to the electric component; determining that the anomaly is caused by an electronic attack in the predetermined area; identifying the new device as a source of the electronic attack; triangulating a location of the new device in the predetermined area; and outputting, by the server, the location of the new device in the predetermined area to a secure component. The secure component is configured to display one or more simulated directions to the location of the electronic attacker in the predetermined area.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 illustrates an example asset mapping table in accordance with one or more embodiments;

FIG. 5 illustrates an example flowchart of a method for detecting an electronic attack in a predetermined area in accordance with one or more embodiments; and FIG. 6 illustrates an example flowchart of a method for detecting an electronic attacker in a predetermined area in accordance with one or more embodiments.

DETAILED DESCRIPTION

Figure 1:
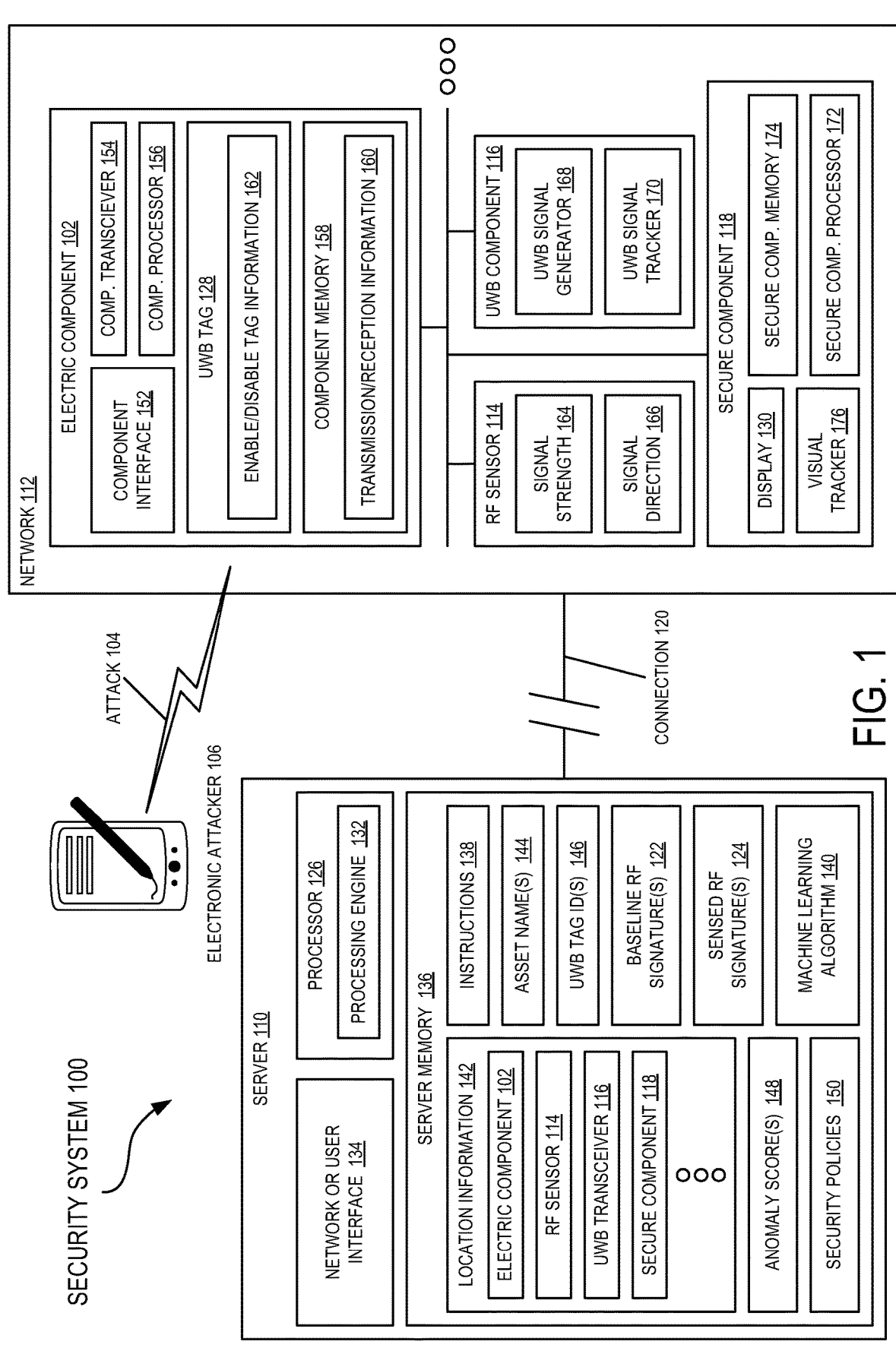
FIG. 1 illustrates an example security system in accordance with one or more embodiments.
Figure 2:
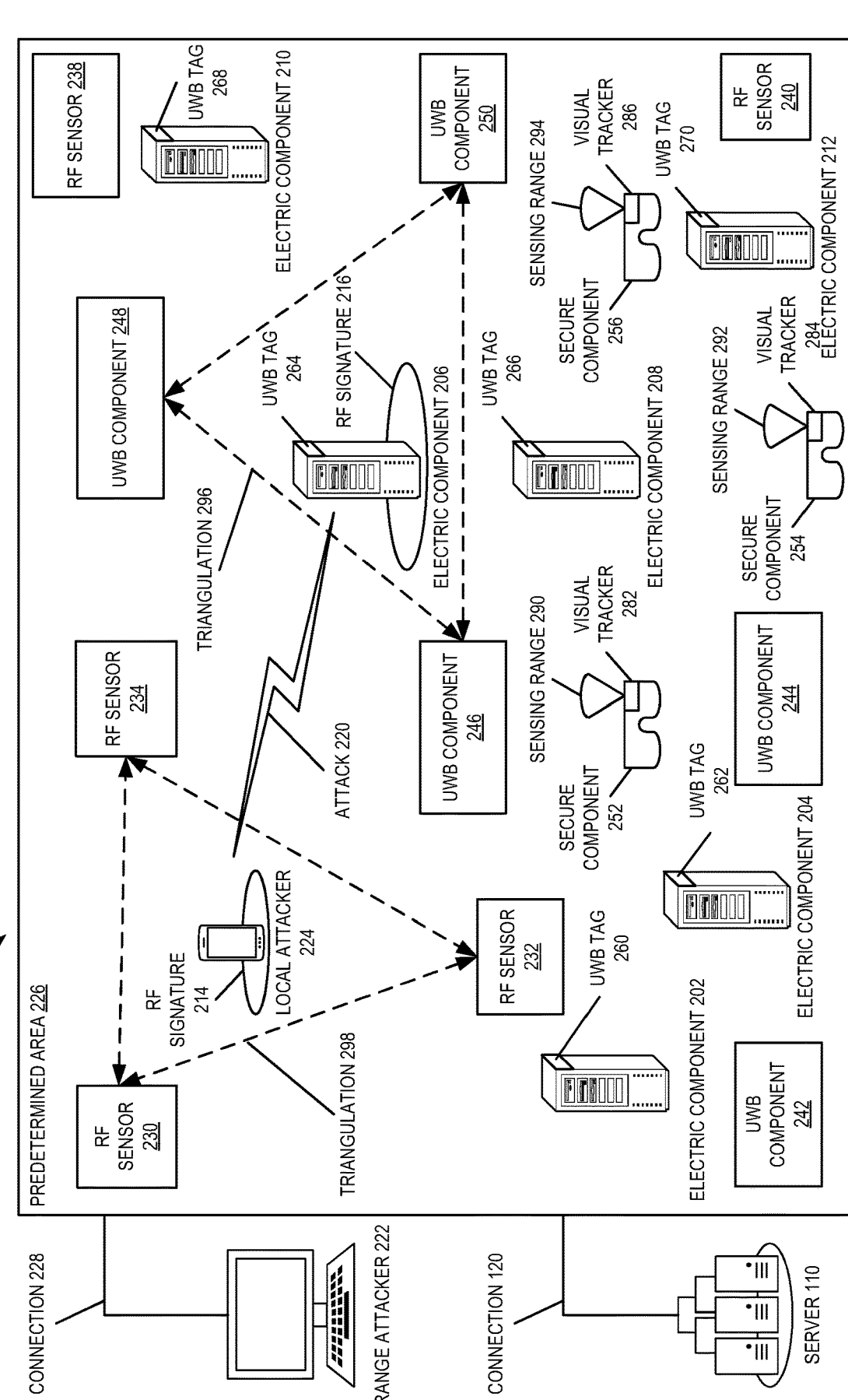
FIG. 2 illustrates an example of one or more security operations in accordance with one or more embodiments.
Figure 3:
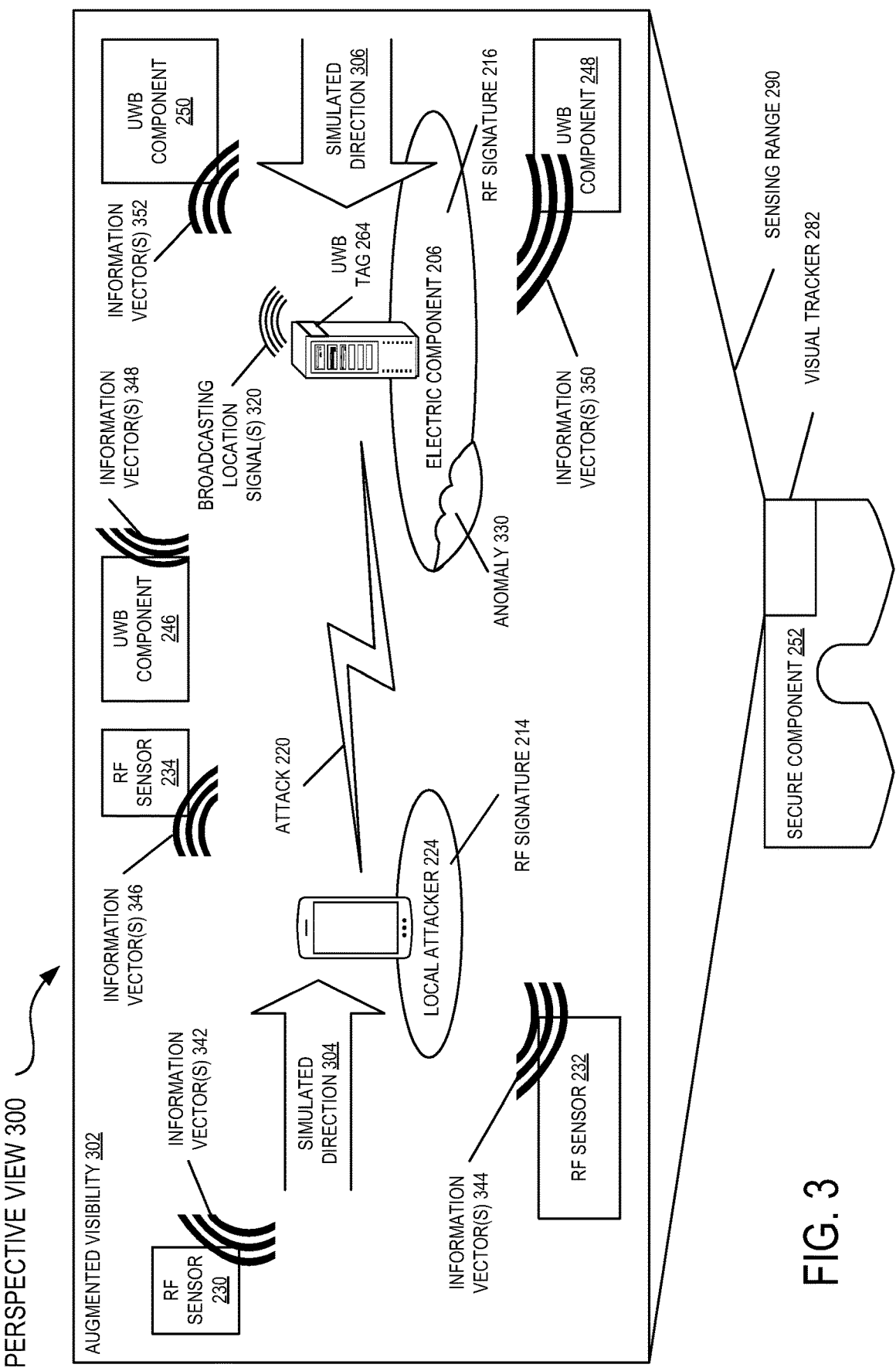
FIG. 3 illustrates an example perspective view of a secure component in accordance with one or more embodiments.

As described above, previous technologies fail to provide efficient and reliable solutions to monitor and identify electric components under electronic attacks from an electronic attacker. In particular, this disclosure provides various systems and methods to accurately detect electronic attacks and electronic attackers in a predetermined area. FIG. 1 illustrates a security system 100 in which at least one electric component 102 is detected to be under an electronic attack 104 from an electronic attacker 106. FIG. 2 illustrates one or more security operations 200 in which the security system 100 of FIG. 1 is configured to monitor one or more electric components 202-212 and individual RF baselines 214 and 216 for possible electronic attacks (i.e., attack 220) or to detect an electronic attacker (i.e., range attacker 222 or local attacker 224). FIG. 3 illustrates a perspective view 300 with augmented visibility 302 as part of one or more of the security operations 200 of FIG. 2. FIG. 4 illustrates an asset mapping table 400 populated as part of one or more of the security operations 200 of FIG. 2. FIG. 5 illustrates a first process 500 to perform one or more of the security operations 200 of FIG. 2. FIG. 6 illustrates a second process 600 to perform one or more of the security operations 200 of FIG. 1.

Security System Overview

FIG. 1 illustrates a security system 100 configured to accurately detect electronic attacks (i.e., attack 104) and electronic attackers (i.e., electronic attacker 106). In the security system 100 of FIG. 1, a server 110 monitors one or more operations performed by multiple devices in a network 112 and identifies at least one electric component 102 in the network 110 that is under the attack 104 from the electronic attacker 106. In FIG. 1, the server 112 is communicatively coupled to multiple devices in the network 112. While FIG. 1, shows the server 110 connected via a connection 120 to the electric component 102, a radio-frequency (RF) sensor 114, an ultra-wideband (UWB) component 116, and a secure components 118, the server 112 may be connected to multiple electric components, multiple RF sensors, multiple UWB components, and multiple secure components among other electronic devices or components in a predetermined area 226 as is shown and described in reference to FIG. 2.

In one or more embodiments, the server 110 is configured to monitor multiple electronic operations of the electric component 102 over a first predetermined amount of time. The electronic operations may be represented by changes in a radio spectrum over the predetermined amount of time as a RF signature. The RF signature is representative of the electronic operations, which include transmission, reception, and processing of data signaling and communication signaling. In some embodiments, the server 110 may be configured to store one or more baseline RF signatures 122 representative of expected electronic operations associated with the electric component 102. In other embodiments, the server 110 may be configured to sense and store one or more sensed RF signatures 124 over time.

In one example, the server 110 may track a sensed RF signature 124 associated with the electric component 102. The sensed RF signature 124 may correspond to the electronic operations of the electric component 102 over time. The server 110 may include a processor 126 that determines that the sensed RF signature 124 comprises an anomaly based at least in part upon the sensed RF signature 124 being different from a corresponding baseline RF signature 122 of the electric component 102. The processor 126 may be configured to determine that the anomaly is caused by an electronic attack 104 in the predetermined area. The processor may trigger broadcasting of multiple location signals (shown in FIG. 3) from an UWB tag 128 coupled to the electric component 102. The location signals may indicate that the electric component 102 is part of the electronic attack 104. In one or more embodiments, the processor 126 may be further configured to triangulate a location of the electric component 102 in the predetermined area. The location may be triangulated based at least in part upon the location signals from the UWB tag 128. Once the location is triangulated, the processor 126 may be configured to output the location of the electric component 102 in the predetermined area to the secure component 118. The secure component 118 may be configured to display (i.e., as an overlay in a display 130) one or more simulated directions (shown in FIG. 3) to the location of the electric component 102 in the predetermined area.

In another example, the server 110 may track a first sensed RF signature 124 associated with the electric component 102. The first sensed RF signature 124 may correspond to the electronic operations of the electric component 102 over time. The server 110 may determine that a new device (i.e., electronic attacker 106) is in the predetermined area in proximity to the electric component 102. Further, the server 110 may use the RF sensor 114 to monitor additional electronic operations of the new device over time. The server 110 may track a second sensed RF signature 124 associated with the new device. The second sensed RF signature 124 may correspond to the additional electronic operations of the new device over time. The server 110 may include a processor 126 that determines that the sensed RF signature 124 comprises an anomaly based at least in part upon the sensed RF signature 124 being different from a corresponding baseline RF signature 122 of the electric component 102. The processor 126 may be configured to determine that the anomaly is caused by an electronic attack 104 in the predetermined area. At this stage, the server 110 may be configured to identify that the new device is a source of the electronic attack 104. The server 110 may use the connection 120 with the RF sensor 114 to triangulate a location of the new device. Once the location is triangulated, the server 110 may be configured to output the location of the electronic attacker 106 in the predetermined area to the secure component 118. The secure component 118 may be configured to display (i.e., as an overlay in a display 130) one or more simulated directions (shown in FIG. 3) to the location of the electric component 102 in the predetermined area.

Security System Components

Server

The server 110 is generally any device that is configured to process data, communicate with user devices (not shown), monitor and track data and control operations of devices in the network 112, databases, systems, and the like, via one or more interfaces. The server 110 is generally configured to oversee operations of the processing engine 132. The operations of the processing engine 132 are described further below in conjunction with the operational flow of the security system 100 described in FIG. 1 and the security operations 200 described in FIG. 2.

The server 110 comprises the processor 126 in signal communication with a network/user interface 134, and a server memory 136. The server 110 may be configured as shown, or in any other configuration.

The processor 126 comprises one or more processors operably coupled to the server memory 136. The processor 126 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 126 may be a programmable logic device, a microcontroller, a microprocessor, or any suitable combination of the preceding. The processor 126 is communicatively coupled to, and in signal communication with, the network/user interface 134, and the server memory 136. The one or more processors 126 are configured to process data and may be implemented in hardware or software. For example, the processor 126 may be 8-bit, 16-bit, 32-bit, 64-bit or of any other suitable architecture. The processor 126 may include an arithmetic logic unit (ALU) for performing arithmetic and logic operations, processor registers that supply operands to the ALU and store the results of ALU operations, and a control unit that fetches software instructions 138 from the server memory 136 and executes them by directing the coordinated operations of the ALU, registers and other components. The one or more processors 126 are configured to implement various instructions. For example, the one or more processors 122 are configured to execute the software instructions 138 to implement the functions disclosed herein, such as some or all of those described with respect to FIGS. 1-6. In some embodiments, the functions described herein are implemented using logic units, FPGAs, ASICs, DSPs, or any other suitable hardware or electronic circuitry.

In one or more embodiments, the network/user interface 134 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The network/user interface 134 may be configured to support any suitable type of communication protocol as would be appreciated by one of ordinary skill in the art.

In one or more embodiments, the network/user interface 134 may be configured to enable wired and/or wireless communications. The network/user interface 134 may be configured to communicate data between the server 110 and user devices (not shown), network devices (i.e., all devices shown or not shown in the network 112), systems, or domain(s). For example, the network interface 134 may comprise a WIFI interface, a LAN interface, a WAN interface, a modem, a switch, or a router. The processor 126 is configured to send and receive data using the network/user interface 134. The network/user interface 134 may be configured to use any suitable type of communication protocol.

The server memory 136 may be volatile or non-volatile and may comprise a read-only memory (ROM), random-access memory (RAM), ternary content-addressable memory (TCAM), dynamic random-access memory (DRAM), and static random-access memory (SRAM). The server memory 136 may be implemented using one or more disks, tape drives, solid-state drives, and/or the like. The server memory 136 is operable to store the software instructions 138, a machine learning (ML) algorithm 140, and multiple information elements of one or more devices in the network 112. The information elements may include location information 142, asset names 144, UWB tag identifiers (IDs) 146, one or more baseline RF signatures 122, one or more sensed RF signatures 124, one or more anomaly scores 148, multiple security policies 150 and/or any other data or instructions associated with one or more devices in the network 112. The software instructions 138 may comprise any suitable set of instructions, logic, rules, or code operable to be executed by the processor 126. In some embodiments, the service policies 150 may be information commanding rules and/or operations of the network 112. The service policies 150 may be updated dynamically over time.

In one or more embodiments, the ML algorithm 140 is configured to analyze, manage, and update one or more devices in the network 112. The ML algorithm 140 may aggregate data records or files that contain information associated with the one or more devices in the network 112. The ML algorithm 140 may be developed by training the security system 100 during an initial period when the devices in the network 112 are actors behaving in a predefined manner associated with expected 'normal' events in the predetermined area using baseline data. The baseline data may include the baseline RF signatures 122 collected during an initial training time. One or more test scenarios may then be performed in the network 112 in which the devices behave in a manner to simulate possible events. The test scenarios may also be used to train the machine learning algorithm 140 to determine feature values that are most relevant to determining anomalies caused by the electronic attack 104. The training scenario data may include the sensed RF signatures 124 collected when one or more training scenarios are in progress. Any number of feature values may be determined as appropriate for a given application.

The ML algorithm 140 may compare the feature values, individually or in any appropriate combination, to threshold values in order to determine the anomaly scores 148. Each anomaly score 148 may correspond to a probability that a given anomaly has occurred. For example, a first anomaly score 148 may correspond to the probability that a security-compromising event occurred (e.g., if the electronic attacker 106 performs erratic operations that interfere with signaling from the electric component 102, if the electric component 102 performs operations that are different from one or more expected operations, or the like). Meanwhile, a second anomaly score 148 may correspond to the probability that a compromising event has occurred. The anomaly scores 148 are used to determine one or more detected anomalies. For example, an anomaly for a given anomaly score 148 may be detected if the anomaly score 148 is greater than a threshold value. In some cases, an anomaly may be detected using a combination of two or more of the anomaly scores 148. For example, a machine learning algorithm 140 may be trained using the baseline data and the training scenario data, as described above, to determine detected anomaly based on a combination of multiple anomaly scores 148.

A machine learning algorithm 152 may be trained (e.g., using baseline data 158 and training scenario data 160 as described above) to determine feature values indicative of compromised safety (i.e., one or more electronic attacks). Once the security-compromising event 136 is detected, the same or similar responses may be automatically implemented, as described above with respect to the other example security-compromising event 136 (e.g., by providing alert(s) 140, tracking instructions 142 to track person 114, and/or device operation instructions 144 to improve security of device 108).

Network

The network 112 facilitates communication between and amongst the various devices of the security system 100. The network 112 may be any suitable network operable to facilitate communication between the server 110 and the devices of the security system 100. The network 112 may include any interconnecting system capable of transmitting audio, video, signals, data, messages, or any combination of the preceding. The network 112 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the devices.

Electric Component

In one or more embodiments, the electric component 102 may include circuit boards, microprocessors, wire cables, memory components, microchips, cash dispensers, user interfaces, among others. Each electric component 102 is designed and fabricated in a particular manner that causes specific EM radiation patterns and I/O electrical signals of the component to be unique to that component. In one or more embodiments, the server 110 extracts baseline RF signatures 122 and sensed RF signatures 124 over time.

In the example of FIG. 1, the electric component includes a component interface 152, a component transceiver 154, a component processor 156, the UWB tag 128, and a component memory 158 communicatively coupled with one another. During the attack 104, one or more of the aforementioned elements may be affected by the electronic attacker 106. The attack 104 may enable the electronic attacker 104 to observe, control, and modify data, communication, and control signaling received/transmitted by the electric component 102.

In one or more embodiments, the component interface 152 may be hardware configured to perform one or more operations as those described in reference to the network/user interface 134. For example, the component interface 152 may be configured to communicate with the server 110 via the connection 120. In some embodiments, the component transceiver 154 may be hardware configured to transmit or receive wireless signals at one or more frequency bandwidths. The component transceiver 154 may include one or more antennas for generating or receiving radio waves. The component processor 156 may be hardware configured to perform one or more operations as those described in reference to processor 126. For example, the component processor 156 may be configured to retrieve instructions (not shown) from the component memory 158 to perform one or more operations of the electric component 102. In other embodiments, the component memory 158 is hardware configured to store multiple information elements, such as transmission and/or reception information 160 associated with the operations of the electric component 102. Although not shown, the component memory 158 may include an electric component asset name, and an electric component UWB tag ID of the UWB tag 128.

In one or more embodiments, the UWB tag 128 is hardware configured to generate multiple broadcasting signals in accordance with a trigger from the server 110. In the example of FIG. 1, the UWB tag 128 may include enable and/or disable tag information 162 corresponding to an enable state in which the UWB tag 128 generates the broadcasting signals or a disabled state in which the UWB tag 128 remains idle. The server 110 may change the enable and/or disable tag information 162 to trigger or stop the broadcasting signals from the UWB tag 128. In some embodiments, the broadcasting signals are UWB signals in which information is transmitted across a wide bandwidth (i.e., greater than 500 megahertz (MHz)). The wide bandwidth enables transmissions of a large amount of signal energy without interfering with conventional narrowband and carrier wave transmission generally used for most wireless signaling of the component transceiver in a same frequency band.

Radio-Frequency Sensor

In one or more embodiments, the RF sensor 114 is hardware configured to receive signal distortions associated with one or more transmitted radio waves. The RF sensor 114 may include one or more antennas for generating or receiving radio waves. The RF sensor 114 may be configured to convert analog RF signaling distortions and to convert these distortions to a digital format. The server 110 may receive the digital format as processed data and help extrapolate the baseline RF signature 122, the sensed RF signature 124, and/or an anomaly score 148. The RF sensor 114 may be configured to determine a signal strength 164 and a signal direction 166. In some embodiments, the signal strength 164 is representative of the strengths of radio/EM feedback received and the signal direction 166 is representative of the direction of radio/EM feedback received. For example, the signal strength 164 and the signal direction 166 may be included in an information vector representing a magnitude and a direction of the radio waves received.

The RF sensor 114 may broadcast multiple sensing signals in multiple directions. The sensing signals may bounce-off multiple surfaces or other RF signaling in a predetermined area. The RF sensor 114 may receive the bounced off sensed signals as feedback in the form of information vectors. Each information vector may include a magnitude of the bounce-off (i.e., the signal strength 164) and a direction of arrival (i.e., the signal direction 166). In this regard, each information vector may indicate a location of the electric component 102 in the predetermined area if the bounce-off signaling is received from the electric component 102. In the case of the new device (such as the electronic attacker 106), the information vectors may indicate the location of the new device in the predetermined area. Upon receiving the information vectors by the RF sensors, the server 110 may triangulate a location of the new device within the predetermined area. After the location of the new device is triangulated, the server may output the location to the secure component 118.

Ultra-Wideband Component

In one or more embodiments, the UWB component 116 is hardware configured to receive UWB signaling associated with one or more transmitted radio waves. The UWB component 116 may include one or more antennas for generating or receiving UWB radio waves. The UWB component 116 may be configured to convert analog UWB signaling distortions and to convert these distortions to a digital format. The server 110 may receive the digital format as processed data and help determine a location of the UWB tag 128 associated with the electric component 102. In some embodiments, the UWB component 116 may include a UWB signal generator 168 to generate one or more UWB signals similar to the broadcasting signals from the UWB tag 126. In other embodiments, the UWB component 116 may include a UWB signal tracker 170 that is configured to determine a signal strength and a signal direction of one or more UWB signals. In yet other embodiments, the signal strength is representative of the strengths of the UWB feedback received and the signal direction is representative of the direction of the UWB feedback received. For example, the signal strength and the signal direction may be included in an information vector representing a magnitude and a direction of the radio waves received. The UWB component 116 may broadcast multiple UWB signals in multiple directions. The UWB signals may be high-power signaling that may be perceived by UWB sensors over long distances. Each information vector may include a magnitude and a direction of departure. In this regard, each information vector may indicate a location of the UWB tag 126 in the predetermined area.

Secure Component

In one or more embodiments, the secure component 118 may be hardware configured to display one or more simulated directions to identify the location of the electric component 102 with the UWB tag 126 and/or the location of the UWB component 116. The secure component 118 may include the display 130 to display one or more simulated environments (i.e., augmented-reality (AR) environments or virtual-reality (VR) environments) such as a smartphone device with AR/VR capabilities. For example, the secure component 118 may overlay the simulated directions in a display that shows the simulated directions as portions of a simulated environment interposed on an actual environment surrounding the secure component 118. In one or more embodiments, the secure component 118 may include a visual tracker 176 configured to receive an UWB receiver and identify suspicious device activity in the predetermined area. In some embodiments, the secure component 118 may be a head-mounted device (HMD) configured to be a portable device that security personnel may carry as part of their work attire. In one or more embodiments, the secure component 118 may be include a gesture mechanisms interface (not shown) in which the information security personnel may coordinate security rules, label/tag suspicious devices, or identify electronic attackers 106 in the predetermined area using visual commands (i.e., via eye-tracking), hand gestures, and/or voice commands. Further, the secure component 118 may include a secure component processor 172, a secure component memory 174, and a transceiver (not shown) configured to generate one or more UWB signals.

In some embodiments, the information security personnel may pair multiple secure components and share suspicious device details to a local shared paired secure network for further consultation. The information security personnel may use the secure component 118 to coordinate detection, tracking, and/or capture of the electronic attacker 106 in the predetermined area. An example of a perspective view 300 of a secure component 310 is shown in reference to FIG. 3.

Electronic Attacker

In one or more embodiments, electronic attacker 106 may be any electronic device that influences the operations of one or more devices in the network 112. In some embodiments, the electronic attacker 106 comprises multiple devices configured to interfere with operations of devices in the network 112. In the example of FIG. 1, the electronic attacker 106 launches the attack 104 to affect the operations performed by the electric component 102. Although not explicitly shown in FIG. 1, the electronic attacker 106 may include a processor, a memory, and a transceiver configured to generate one or more communication signals. In one or more embodiments, the electronic attacker 106 is a new device in a predetermined area in which the electric component 102 is located. In some embodiments, radio waves and/or EM signaling from the electronic attacker 106 is monitored over time to generate a sensed RF signature of the electronic attacker 106.

In one or more embodiments, the electronic attacker 106 may be a person, people, or an automated electric component that use an RF attack to hack communications and operations of a specific wireless electric component 102. As a result of the RF attack, the electronic attacker 106 may control communications or operations of the hacked wireless electric component 102. In this regard, the electronic attacker 106 may modify, cancel, or generate communications or operations in the hacked wireless electric component 102.

Operational Flow Overview

FIG. 2 illustrates one or more security operations 200 performed in a predetermined area 226, in accordance with one or more embodiments. The security operations 200 may include security operations to detect electronic attacks (i.e., the attack 220) and security operations to detect electronic attackers (i.e., range attacker 222 connected to the predetermined area 226 via the connection 228 or local attacker 224 disposed in the predetermined area 226). In the example of FIG. 2, the predetermined area 226 includes electric components 202-212, RF sensors 230-240, UWB components 242-250, and multiple secure components 252-256. As described above, each of the electric components 202-212 includes a corresponding UWB tag 260-270. In this regard, the electric component 202 includes a UWB tag 260; the electric component 204 includes a UWB tag 262; the electric component 206 includes a UWB tag 264; the electric component 208 includes a UWB tag 266; the electric component 210 includes a UWB tag 268; and the electric component 212 includes a UWB tag 270. Further, each of the secure components 252-256 may include a corresponding visual tracker 282-286 with a corresponding sensing range 290-294. In this regard, a secure component 252 includes a visual tracker 282 with a sensing range 290; a secure component 254 includes a visual tracker 284 with a sensing range 292; and a secure component 256 includes a visual tracker 286 with a sensing range 294.

In one or more embodiments, the electric components 202-212 and the UWB tags 260-270 may be configured to perform one or more operations as those described in reference to the secure component 102 and the UWB tag 126 in FIG. 1, respectively. In some embodiments, the RF sensors 230-240 may be configured to perform one or more operations as those described in reference to the RF sensor 114 in FIG. 1. Similarly, the UWB components 242-250 may be configured to perform one or more operations as those described in reference to the UWB component 116 in FIG. 1. Further, the secure components 252-256 and the visual trackers 282-286 may be configured to perform one or more operations as those described in reference to the secure component 118 and the visual tracker 176 in FIG. 1, respectively.

Security Operations to Detect Electronic Attacks

In one or more embodiments, the server 110 is configured to identify and report RF-based attacks, such as attack 220. The server 110 may be connected to multiple electronic devices in the predetermined area 226 in the manner described in FIG. 1. For example, the server 110 may monitor the RF signature 216 of the electric component 206. The RF signature 216 is monitored to identify anomalies, which are unexpected changes in the signaling transmitted to/from any of the electric component 206. In the example of FIG. 2, the UWB components 242-250 use UWB signaling to alert the server 110 of any anomalies identified.

In some embodiments, the electric component 206 includes the UWB tag 264. The UWB tag 264 is configured to broadcast location signals that indicate locations for the electric component 206. For example, upon determining that an anomaly is identified in the RF signature 216 of the electric component 206, the server 110 may trigger the UWB tag 264 to broadcast its location information within the predetermined area 226. The server 110 may display simulated directions to the location of the electric component 206 within the predetermined area 226 via the secure components 252-256.

Security Operations to Detect Electronic Attackers

In one or more embodiments, the server 110 is configured to identify and report RF-attackers in the predetermined area 226. The server 110 may be connected to multiple electronic devices in the predetermined area 226 in the manner described in FIG. 1. Further, the server 110 may be configured to identify new electronic devices in the predetermined area 226. For example, the server 110 may monitor the RF signature 216 of a new electronic device (such as the local attacker 224) in the predetermined area 226 using the RF sensors 230-240. The server 110 may be configured to identify interference/malicious signaling between the local attacker 224 and electric component 206. The server 110 may rely on data collected using the RF sensors 230-240 in the predetermined area 226 to accurately determine the location of the local attacker 224. The server 110 may display simulated directions to the location of the electric component 202 within the predetermined area 226 via the secure components 252-256.

Record Baseline Radio-Frequency Patterns

The operational flow to detect RF attacks or to detect RF attackers may begin with the server 110 collecting a baseline RF signature from at least one electric component in the predetermined area 226. In the example of FIG. 2, the server 110 monitor multiple RF signatures of multiple electric components 202-212 in the predetermined area 226. The predetermined area 226 may be a room, a building, or a predefined space. The security system 100 may monitor the RF signature 216 of the electric component 206. As described above, each RF signature may be a representation of RF signaling transmitted and received by a specific electric component in the predetermined area. For example, the RF signaling may include EM radiation signals, I/O electrical (e.g., voltage and current) signals, and electric component properties (e.g., electric component serial number). The RF signatures may be a string of numerical, alphabetical, or alphanumerical values that indicate the RF signaling of the electric component. The server 110 may store a baseline RF signature for the electric component 206 in the predetermined area.

Monitor a Radio-Frequency Signature of Electronic Components in the Predetermined Area In other embodiments, during a predetermined amount of time, the server 110 may compare a baseline RF signature from storage to a corresponding sensed RF signature sensed in the predetermined amount of time from one of the electric components 202-212. For example, the server 110 may compare monitored and stored RF signatures for the electric component 206. At this point, the server 110 may determine whether an anomaly is found based on a result of the comparison between the baseline RF signature and the sensed RF signature of the electric component 206. In this regard, the result of the comparison indicates that the baseline RF signature and the sensed RF signature are equal to one another or that the second baseline RF signature and the second specific RF signature are different to one another. In some embodiments, the anomaly may be one or more unexpected changes to the second RF signature in the predetermined amount of time. For example, the anomaly may be unexpected fluctuations in the second RF signaling of the electric component. An example of the anomaly is shown in FIG. 3.

Monitor a Radio-Frequency Signature of a New Device in the Predetermined Area

In other embodiments, the local attacker 224 is expected to enter the predetermined area 226 as a new device. The new device may be detected by the RF sensors 230-234 that identify a new RF signature (i.e., the RF signature 214). The RF sensors 230-234 may be configured to identify and monitor radio waves and frequency signals in the predetermined area 226. In some embodiments, the RF sensors 230-234 may identify and track new RF signatures in the predetermined area 226. In this regard, the new RF signature may be determined to correspond to the new device in the predetermined area 226. The new RF signature may be monitored in relation to existing RF signatures (i.e., baseline RF signatures) corresponding to the electric component 206 located in the predetermined area 226. The new RF signature may be monitored to track interactions of the new device with one or more of the electric components in the predetermined area 226. Over the predetermined amount of time, the server may monitor interactions between the new device and a specific electric component in the predetermined area 226. For example, the server 110 may monitor interactions between the local attacker 224 and the electric component 206.

Detect Radio-Frequency Attacks

In one or more embodiments, upon determining the anomaly in an RF signature during the predetermined amount of time, the server 110 determines that the electric component 206 is caused by the electronic attack 220 in the predetermined area 226. The server 110 may trigger broadcasting of multiple location signals from the UWB tag 264 coupled to the electric component 202. The UWB tag 264 may broadcast the location signals in multiple directions. The location signals may indicate a location of the electric component 206. The broadcasted location signals may be detected by one or more UWB components 242-250 located at multiple locations of the predetermined area. Each UWB component 242-250 may relay information about any received location signals. Upon receiving the information relayed by the UWB components 242-250, the server 110 may triangulate a location of the electric component within the predetermined area.

After the location of the electric component 206 is triangulated in the triangulation 296, the server 110 may output the location to one or more secure components 252-256. One of the secure components 252-256 may be device in use by security personnel in the predetermined area 226.

Detect Radio-Frequency Attackers

In one or more embodiments, upon determining that the electric component 206 is caused by the electronic attack 220 in the predetermined area 226, the server 110 identifies the local attacker 224 perpetrating the electronic attack 220. In some embodiments, the server 110 may determine that the new device is the local attacker 224 upon determining that the anomaly resulted from a change identified in the new RF signature. To determine the location of the new device, the server 110 may trigger broadcasting of multiple sensing signals from one or more RF sensors 230-240. The RF sensors 230-240 may broadcast the sensing signals in multiple directions. The sensing signals may bounce-off multiple surfaces or other RF signaling in the predetermined area 226. The RF sensors 230-240 may receive the bounced off sensed signals as feedback in the form of information vectors. Each information vector may include a magnitude of the bounce-off and a direction of arrival. In this regard, each information vector may indicate a location of any electric components in the predetermined area. In the case of the new device, the information vectors may indicate the location of the new device in the predetermined area 226. Upon receiving the information vectors by the RF sensors 230-240, the server 110 may triangulate a location of the new device within the predetermined area. After the location of the new device is triangulated in triangulation 298, the server 110 may output the location to one or more secure components 252-256.

Track the Radio-Frequency Attack or the Radio-Frequency Attacker

In some embodiments, the secure components 252-256 are simulated reality devices configured to display simulated directions to the location of the electric component 206 in the predetermined area 226 in an augmented visibility field. In some embodiments, the augmented visibility field comprises the simulated directions within a predetermined sensing range (such as the sensing ranges 290-294). The predetermined sensing range may include a field of view in an augmented version of an environment surrounding the secure component, as it is shown in FIG. 3.

Perspective View Overview

FIG. 3 illustrates a perspective view 300 of a secure component 252, in accordance with one or more embodiments. In FIG. 3, the secure component 252 provides an augmented visibility 302 in which the secure component 252 shows multiple devices in the predetermined area 226 over the sensing range 290 collected via the visual tracker 282. As described above, the visual tracker 282 may be a combination of a camera and/or a depth sensor configured to provide a see-through display of an environment surrounding the secure component 310 in the predetermined area 226. In the example of FIG. 3, the augmented visibility 302 shows the RF sensors 230-234, the UWB components 246-250, the electric component 206, and the local attacker 224 of FIG. 2. In one or more embodiments, the electric component 206 includes the UWB tag 264 in which one or more broadcasting location signals 320 may be triggered upon identifying an anomaly 330.

Tracking an Electric Component Under an Electronic Attack

In one or more embodiments, the server 110 determines that the RF signature 216 comprises the anomaly 330 based at least in part upon the RF signature 216 being different from a baseline RF signature corresponding to the electric component 206. The server 110 may determine that the anomaly 330 is caused by the electronic attack 220 in the predetermined area 226. At this point, the server 110 may trigger broadcasting location signals 320 from the UWB tag 264 coupled to the electric component 206. The broadcasting location signals 320 indicate that the electric component 206 is part of the electronic attack 220.

In some embodiments, the server 110 triangulates a location of the electric component 206 in the predetermined area 226. The location is triangulated based at least in part upon the broadcasting location signals 320 from the UWB tag 264. As shown in the example of FIG. 3; the server 110 outputs the location of the electric component 206 in the predetermined area 226 to the secure component 252. In this regard, the secure component 252 is configured to display one or more simulated directions 306 to the location of the electric component 206 in the predetermined area 226.

In other embodiments, the UWB components 246-250 receive the broadcasting location signals 320 of the UWB tag 264 as one or more information vectors 348-352. Each information vector may indicate a possible location of the electric component 206 in the predetermined area 226. Once the one or more information vectors 348-352 are obtained, the server 110 triangulates the location of the electric component 206 following the operations described in association with the triangulation 296. Upon determining the location of the electric component 206, the simulated direction 306 is presented to the secure component 252.

In one or more embodiments, for example, if the location of the electric component 206 may be identified in a first cubicle in a third floor of a building, the secure component 252 may be provided a start of simulated directions to identify the electric component 206. In one example, if the secure component 252 is located in the third floor, the secure component 252 may immediately display an overlay of the simulated directions 306 indicating the attacked electric component in the first cubicle. In another example, if the secure component 252 is located in a first floor of the building, the secure component 252 may immediately display an overlay of the simulated directions indicating that the electric component 206 is located in the third floor. In this case, the secure component 252 may overlay simulated directions 306 instructing security personnel using the secure component 252 to take the fastest route to the third floor.

Tracking an Electronic Attacker

In one or more embodiments, the server 110 determines that the RF signature 216 comprises the anomaly 330 during a predetermined amount of time based at least in part upon the RF signature 216 being different from a baseline RF signature corresponding to the electric component 206. The server 110 may determine that the anomaly 330 is caused by the electronic attack 220 in the predetermined area 226. At this point, the server 110 may identify the local attacker 224 as a source of the electronic attack 220 using RF distortion information collected by the RF sensors 230-234.

In some embodiments, the server 110 triangulates a location of the local attacker 224 in the predetermined area 226. The location is triangulated based at least in part upon the feedback received by the RF sensors 230-234. As shown in the example of FIG. 3; the server 110 outputs the location of the local attacker 224 in the predetermined area 226 to the secure component 252. In this regard, the secure component 252 is configured to display one or more simulated directions 304 to the location of the local attacker 224 in the predetermined area 226.

In other embodiments, the RF sensors 230-234 receive one or more information vectors 342-346 as feedback from RF distortion in the predetermined area 226. Each information vector may indicate a possible location of the local attacker 224 in the predetermined area 226. Once the one or more information vectors 342-346 are obtained, the server 110 triangulates the location of the local attacker 224 following the operations described in association with the triangulation 298. Upon determining the location of the local attacker 224, the simulated direction 308 is presented to the secure component 252.

In one or more embodiments, for example, if the location of the local attacker 224 may be identified in a first office in a first floor of a building, the secure component 252 may be provided a start of simulated directions to identify the electronic attacker. In one example, if the secure component 252 is located in the first floor, the secure component 252 may immediately display an overlay of the simulated directions 304 indicating the local attacker 224 in the first office. In another example, if the secure component 252 is located in a third floor of the building, the secure component 252 may immediately display an overlay of the simulated directions indicating that the local attacker 224 is located in the first floor. In this case, the secure component 252 may overlay simulated directions 304 instructing security personnel using the secure component 525 to take the fastest route to the first floor.

Asset Mapping Table

FIG. 4 illustrates an asset mapping table 400, in accordance with one or more embodiments. In one or more embodiments, the asset mapping table 400 is populated as the server 110 evaluates baseline RF signatures and sensed RF signatures from new and existing devices in the predetermined area 226 or connected to the network 112. In one or more embodiments, the asset mapping table 400 includes multiple sections such as an asset name, a UWB tag ID, an RF signature, an anomaly score, an electric component location and a security policy for each element in the asset mapping table 400. The asset mapping table may be stored in the server memory 136 of FIG. 1 to track the state of each electric component in a predetermined area.

As shown in the example of FIG. 4, the asset names may correspond to multiple devices (i.e., WiFi routers, servers, printers, and the like); the UWB tag IDs may indicate a serialized version of the asset name; the RF signatures may indicate values representative of the transmissions associated with a specific electric component; and the anomaly score may indicate differences between a sensed RF signature and a baseline RF signature of the specific electric component. In some embodiments, a higher anomaly score indicates fewer similarities between the sensed RF signature and the baseline RF signature and a lower anomaly score indicates more similarities between the sensed RF signature and the baseline RF signature of the specific electric component.

In some embodiments, the electric component location includes location information of the specific electric component. Further, a security policy may be representative of an action to be taken by a security personnel upon reaching the specific electric component undergoing an electronic attack. In the example of FIG. 4, these security policies instruct one or more secure components to disconnect, isolate, monitor, or ignore the specific electric component.

Example Processes

FIGS. 5 and 6 illustrate respective example flowcharts of a process 500 and a process 600, in accordance with one or more embodiments. Modifications, additions, or omissions may be made to the processes 500 and 600. The processes 500 and 600 may include more, fewer, or other operations than those shown below. For example, operations may be performed in parallel or in any suitable order. While at times discussed as the server 110, the RF sensor 114, the UWB component 116, the secure component 118, or components of any of thereof performing operations described in the operations, any suitable system or components of the security system 100 may perform one or more operations of the processes 500 and 600. For example, one or more operations of processes 500 or 600 may be implemented, at least in part, in the form of software instructions 138 of FIG. 1, stored on non-transitory, tangible, machine-readable media (e.g., server memory 136 of FIG. 1) that when run by one or more processors (e.g., processor 126 of FIG. 1) may cause the one or more processors to perform operations described in operations 502-516 or operations 602-620.

Example Process to Detect Radio-Frequency Attacks

FIG. 5 illustrates an example flowchart of a process 500 to detect radio-frequency attacks, in accordance with one or more embodiments.

The process 500 starts at operation 502, where a server 110 monitors multiple electronic operations of an electric component (i.e., electric components 206 of FIGS. 2 and 3) over a predetermined amount of time. The electric component 206 is located in a predetermined area 226. In this example, the server 110 monitors transmissions in and out of the electric component 206.

The process 500 continues at operation 504, where the server 110 tracks an RF signature 216 associated with the electric component 206. The RF signature 216 may correspond to the electronic operations of the electric component 206 over the predetermined amount of time. At operation 506, the server 110 determines that the RF signature 216 comprises an anomaly 330 during the predetermined amount of time based at least in part upon the RF signature 216 being different from a baseline RF signature (i.e., one of the baseline RF signatures 122) corresponding to the electric component 206.

At operation 510, the server 110 may determine whether the anomaly 330 is caused by an electronic attack in the predetermined area 226. If the anomaly 330 is not caused by the electronic attack (i.e., NO), the process 500 returns to operation 502. At operation 502, the server 110 returns to monitoring multiple electronic operations associated with the electric component 206. If the anomaly 330 is caused by the electronic attack (i.e., YES), the process 500 proceeds to operation 512. At operation 512, the server 110 triggers broadcasting of multiple location signals 320 from a UWB tag 264 coupled to the electric component 206. The location signals 320 indicate that the electric component 206 is part of the electronic attack 220. As described above, the electric component 206 is part of the electronic attack 220 if the RF signature 216 is determined to be changed unexpectedly over the predetermined amount of time.

The process 500 continues at operation 514, where the server 110 is further configured to triangulate a location of the electric component 206 in the predetermined area 226. The location is triangulated based at least in part upon the location signals from the UWB tag 264.

The process 500 ends at operation 516, where the server 110 outputs the location of the electric component 206 in the predetermined area 226 to a secure component 252. In one or more embodiments, the secure component 252 is configured to display one or more simulated directions 306 to the location of the electric component 206 in the predetermined area 226. The output may be provided to the secure component 252 in the manner described in reference to FIGS. 1-3.

Example Process to Detect Radio-Frequency Attackers

FIG. 6 illustrates an example flowchart of a process 600 to detect RF attackers, in accordance with one or more embodiments.

The process 600 starts at operation 602, where a server 110 monitors multiple electronic operations of an electric component (i.e., electric components 206 of FIGS. 2 and 3) over a predetermined amount of time. The electric component 206 is located in a predetermined area 226. In this example, the server 110 monitors transmissions in and out of the electric component 206.

The process 500 continues at operation 504, where the server 110 tracks a first RF signature 216 associated with the electric component 206. The first RF signature 216 corresponds to the electronic operations of the electric component 206 over the first predetermined amount of time. At operation 606, the server 110 determines that a new device (i.e., the local attacker 224) is in the predetermined area 226 within the first predetermined amount of time. At operation 608, the server 110 monitors multiple electronic operations of the new device over a second predetermined amount of time. In some embodiments, the second predetermined amount of time is within the first predetermined period of time. At operation 610, the server 110 tracks a second RF signature 214 associated with the new device. The second RF signature 214 corresponds to the electronic operations of the new device over the second predetermined amount of time. At operation 612, the server 110 determines that the first RF signature 216 comprises an anomaly 330 during the second predetermined amount of time based at least in part upon the first RF signature being different from a baseline RF signature corresponding to the electric component 206.

At operation 614, the server 110 may determine whether the anomaly 330 is caused by an electronic attack 220 in the predetermined area 226. If the anomaly 330 is not caused by the electronic attack (i.e., NO), the process 600 returns to operation 606. At operation 606, a newer device is evaluated for a newer RF signature. If the anomaly 330 is caused by the electronic attack (i.e., YES), the process 500 proceeds to operation 616. At operation 616, the server 110 identifies the new device as a source of the electronic attack 220.

The process 600 continues at operation 618, where the server 110 is further configured to triangulate a location of the new device in the predetermined area 226.

The process 600 ends at operation 620, where the server 110 outputs the location of the new device (i.e., local attacker 224) in the predetermined area 224 to a secure component 252. In one or more embodiments, the secure component 252 is configured to display one or more simulated directions 304 to the location of the local attacker 224 in the predetermined area 226. The output may be provided to the secure component 252 in the manner described in reference to FIGS. 1-3.

Scope of the Disclosure

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus, comprising:
a memory, configured to store:
a baseline radio-frequency (RF) signature corresponding to an electric component located in a predetermined area, the baseline RF signature comprising an expected RF signature tracked from the electric component during a predetermined amount of time; and
a processor communicatively coupled to the memory and configured to:
monitor a plurality of electronic operations of the electric component over the predetermined amount of time, the electric component being located in the predetermined area;
track an RF signature associated with the electric component, the RF signature corresponding to the plurality of electronic operations of the electric component over the predetermined amount of time;
determine that the RF signature comprises an anomaly during the predetermined amount of time based at least in part upon the RF signature being different from the baseline RF signature corresponding to the electric component;
determine that the anomaly is caused by an electronic attack in the predetermined area;
trigger broadcasting of a plurality of location signals from an ultra-wideband (UWB) tag coupled to the electric component, the plurality of location signals indicating that the electric component is part of the electronic attack;
triangulate a location of the electric component in the predetermined area, the location being triangulated based at least in part upon the plurality of location signals from the UWB tag; and
output the location of the electric component in the predetermined area to a secure component, the secure component being configured to display one or more simulated directions to the location of the electric component in the predetermined area.

2. The apparatus of claim 1, wherein the processor is further configured to:
in conjunction with tracking the RF signature associated with the electric component, compare the RF signature and the baseline RF signature; and
in response to the RF signature and the baseline RF signature being different to one another, determine that the RF signature comprises the anomaly during the predetermined amount of time.

3. The apparatus of claim 2, wherein the processor is further configured to
in conjunction with comparing the RF signature and the baseline RF signature, determine an anomaly score indicating differences between the RF signature and the baseline RF signature, wherein a higher anomaly score indicates fewer similarities between the RF signature and the baseline RF signature and a lower anomaly score indicates more similarities between the RF signature and the baseline RF signature.

4. The apparatus of claim 1,
wherein the memory is further configured to store:
an asset name identifying the electric component located in the predetermined area; and
a UWB tag identifier (ID) assigned to the UWB tag coupled to the electric component; and
wherein the processor is further configured to:
receive the asset name assigned to the electric component from the memory;
relate the asset name assigned to the electric component to the UWB tag ID assigned to the UWB tag coupled to the electric component;
transmit triggering commands to the UWB tag for the broadcasting of the plurality of location signals; and
in response to determining that the anomaly is caused by the electronic attack, trigger the broadcasting of the plurality of location signals from the UWB tag coupled to the electric component based at least in part upon the triggering commands.

5. The apparatus of claim 1, wherein the processor is further configured to:
receive the asset name assigned to the electric component from the memory;
relate the asset name assigned to the electric component to the UWB tag ID assigned to the UWB tag coupled to the electric component;
transmit triggering commands to the UWB tag for the broadcasting of the plurality of location signals; and
in response to determining that the anomaly is caused by the electronic attack, trigger the broadcasting of the plurality of location signals from the UWB tag coupled to the electric component based at least in part upon the triggering commands, wherein:
a first information vector associated with the first location signal is determined by a first UWB component; and the first information vector indicates a first possible location of the electric component in the predetermined area; and triangulate the location of the electric component in the predetermined area based at least in part upon the first information vector.

6. The apparatus of claim 5, wherein the processor is further configured to:

receive a second information vector associated with a second location signal of the plurality of location signals from the UWB tag, wherein:

the second information vector associated with the second location signal is determined by a second UWB component; and the second information vector indicates a second possible location of the electric component in the predetermined area; and triangulate the location of the electric component in the predetermined area based at least in part upon the first information vector and the second information vector.

7. The apparatus of claim 1, wherein the secure component is a simulated reality device configured to:

display the simulated directions to the location of the electric component in the predetermined area in an augmented visibility field, the augmented visibility field comprising the simulated directions within a predetermined sensing range.

8. A system, comprising:

a plurality of ultra-wideband (UWB) components located in a predetermined area; and a server communicatively coupled to the plurality of UWB components, comprising:

a memory, configured to store a baseline radio-frequency (RF) signature corresponding to an electric component located in the predetermined area, the baseline RF signature comprising an expected RF signature tracked from the electric component during a predetermined amount of time; and a processor communicatively coupled to the memory and configured to:

monitor a plurality of electronic operations of the electric component over the predetermined amount of time, the electric component being located in the predetermined area;

track an RF signature associated with the electric component, the RF signature corresponding to the plurality of electronic operations of the electric component over the predetermined amount of time;

determine that the RF signature comprises an anomaly during the predetermined amount of time based at least in part upon the RF signature being different from the baseline RF signature corresponding to the electric component;

determine that the anomaly is caused by an electronic attack in the predetermined area;

trigger broadcasting of a plurality of location signals from an ultra-wideband (UWB) tag coupled to the electric component, the plurality of location signals indicating that the electric component is part of the electronic attack;

triangulate a location of the electric component in the predetermined area, the location being triangulated based at least in part upon the plurality of location signals from the UWB tag; and output the location of the electric component in the predetermined area to a secure component, the secure component being configured to display one or more simulated directions to the location of the electric component in the predetermined area.

9. The system of claim 8, wherein the processor is further configured to:

in conjunction with tracking the RF signature associated with the electric component, compare the RF signature and the baseline RF signature; and in response to the RF signature and the baseline RF signature being different to one another, determine that the RF signature comprises the anomaly during the predetermined amount of time.

10. The system of claim 8, wherein the memory is further configured to store:

an asset name identifying the electric component located in the predetermined area; and a UWB tag identifier (ID) assigned to the UWB tag coupled to the electric component; and wherein the processor is further configured to:

receive the asset name assigned to the electric component from the memory;

relate the asset name assigned to the electric component to the UWB tag ID assigned to the UWB tag coupled to the electric component;

transmit triggering commands to the UWB tag for the broadcasting of the plurality of location signals; and in response to determining that the anomaly is caused by the electronic attack, trigger the broadcasting of the plurality of location signals from the UWB tag coupled to the electric component based at least in part upon the triggering commands.

11. The system of claim 8, wherein a first UWB component of the plurality of UWB components is configured to:

receive a first location signal of the plurality of location signals from the UWB tag;

determine a first information vector associated with the first location signal, the first information vector indicating a first possible location of the electric component in the predetermined area;

transmit the first information vector to the server; and wherein the processor is further configured to:

in conjunction with triggering the broadcasting of the plurality of location signals from the UWB tag coupled to the electric component, receive the first information vector associated with the first location signal; and triangulate the location of the electric component in the predetermined area based at least in part upon the first information vector.

12. The system of claim 11, wherein a second UWB component of the plurality of UWB components is configured to:

receive a second location signal of the plurality of location signals from the UWB tag;

determine a second information vector associated with the second location signal, the second information vector indicating a second possible location of the electric component in the predetermined area;

transmit the second information vector to the server; and wherein the processor is further configured to:

in conjunction with triggering the broadcasting of the plurality of location signals from the UWB tag coupled to the electric component, receive the second information vector associated with the second location signal; and triangulate the location of the electric component in the predetermined area based at least in part upon the second information vector.

13. The system of claim 8, wherein the secure component is a simulated reality device configured to:

display the simulated directions to the location of the electric component in the predetermined area in an augmented visibility field, the augmented visibility field comprising the simulated directions within a predetermined sensing range.

14. A method to detect electronic attacks in a predetermined area, comprising:

monitoring, by a server, a plurality of electronic operations of an electric component over a predetermined amount of time, the electric component being located in the predetermined area;

tracking, by the server, a radio-frequency (RF) signature associated with the electric component, the RF signature corresponding to the plurality of electronic operations of the electric component over the predetermined amount of time;

determining, by the server, that the RF signature comprises an anomaly during the predetermined amount of time based at least in part upon the RF signature being different from a baseline RF signature corresponding to the electric component;

determining, by the server, that the anomaly is caused by an electronic attack in the predetermined area;

triggering, by the server, broadcasting of a plurality of location signals from an ultra-wideband (UWB) tag coupled to the electric component, the plurality of location signals indicating that the electric component is part of the electronic attack;

triangulating, by the server, a location of the electric component in the predetermined area, the location being triangulated based at least in part upon the plurality of location signals from the UWB tag; and outputting, by the server, the location of the electric component in the predetermined area to a secure component, the secure component being configured to display one or more simulated directions to the location of the electric component in the predetermined area.

15. The method of claim 14, further comprising:

storing, by the server, the baseline RF signature corresponding to the electric component, the baseline RF signature comprising an expected RF signature tracked from the electric component during the predetermined amount of time;

in conjunction with tracking the RF signature associated with the electric component, comparing, by the server, the RF signature and the baseline RF signature; and in response to the RF signature and the baseline RF signature being different to one another, determining that the RF signature comprises the anomaly during the predetermined amount of time.

16. The method of claim 15, further comprising:

in conjunction with comparing the RF signature and the baseline RF signature, determining an anomaly score indicating differences between the RF signature and the baseline RF signature, wherein a higher anomaly score indicates fewer similarities between the RF signature and the baseline RF signature and a lower anomaly score indicates more similarities between the RF signature and the baseline RF signature.

17. The method of claim 14, further comprising:

receiving an asset name assigned to the electric component;

relating, by the server, the asset name assigned to the electric component to a UWB tag identifier (ID) assigned to the UWB tag coupled to the electric component;

transmitting, by the server, triggering commands to the UWB tag for the broadcasting of the plurality of location signals; and in response to determining that the anomaly is caused by the electronic attack, triggering, by the server, the broadcasting of the plurality of location signals from the UWB tag coupled to the electric component based at least in part upon the triggering commands.

18. The method of claim 14, further comprising:

receiving, by a first UWB component, a first location signal of the plurality of location signals from the UWB tag;

determining, by the first UWB component, a first information vector associated with the first location signal, the first information vector indicating a first possible location of the electric component in the predetermined area;

transmitting, by the first UWB component, the first information vector to the server;

in conjunction with triggering the broadcasting of the plurality of location signals from the UWB tag coupled to the electric component, receiving, by the server, the first information vector associated with the first location signal; and triangulating, by the server, the location of the electric component in the predetermined area based at least in part upon the first information vector.

19. The method of claim 18, further comprising:

receiving, by a second UWB component, a second location signal of the plurality of location signals from the UWB tag;

determining, by the second UWB component, a second information vector associated with the second location signal, the second information vector indicating a second possible location of the electric component in the predetermined area;

transmitting, by the second UWB component, the second information vector to the server;

in conjunction with triggering the broadcasting of the plurality of location signals from the UWB tag coupled to the electric component, receiving, by the server, the second information vector associated with the second location signal; and triangulating, by the server, the location of the electric component in the predetermined area based at least in part upon the first information vector and the second information vector.

20. The method of claim 14, wherein the secure component is a simulated reality device configured to:

display the simulated directions to the location of the electric component in the predetermined area in an augmented visibility field, the augmented visibility field comprising the simulated directions within a predetermined sensing range.

* * * * *